June 27, 1950     F. D. BRADDON     2,512,607
GYROSCOPIC FLIGHT INDICATOR
Filed Jan. 31, 1945     2 Sheets-Sheet 1
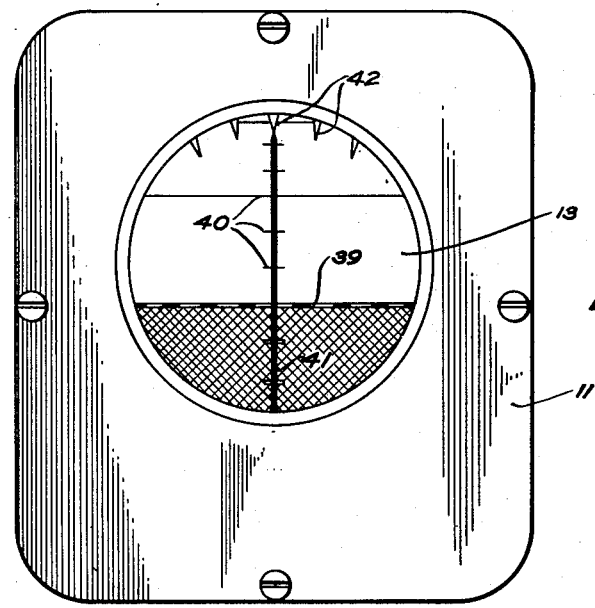
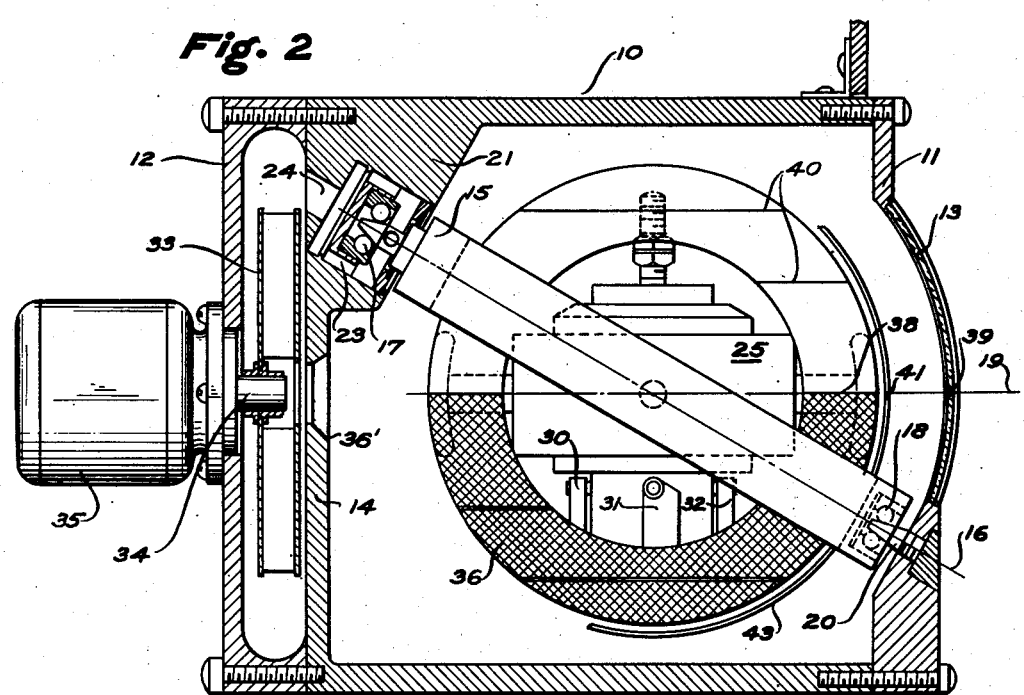
INVENTOR
FREDERICK D. BRADDON
BY
Herbert H. Thompson
his ATTORNEY.

June 27, 1950　　　　　F. D. BRADDON　　　　　2,512,607
GYROSCOPIC FLIGHT INDICATOR
Filed Jan. 31, 1945　　　　　　　　　　　　2 Sheets-Sheet 2
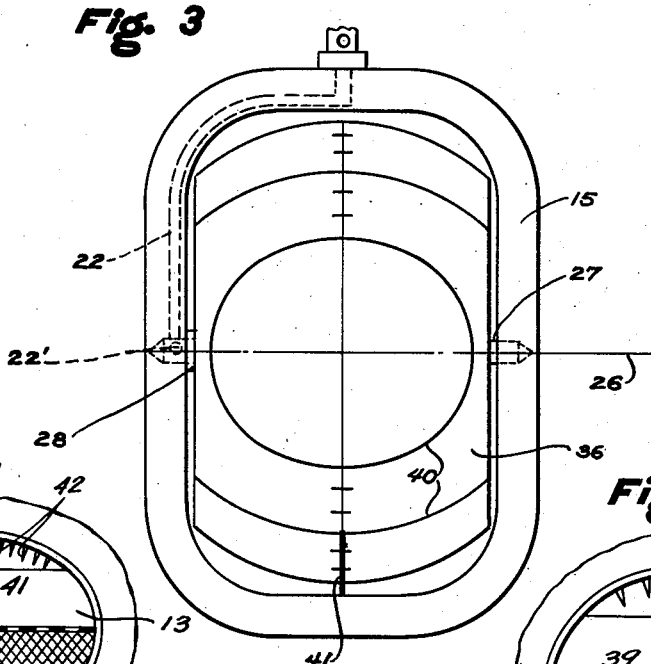
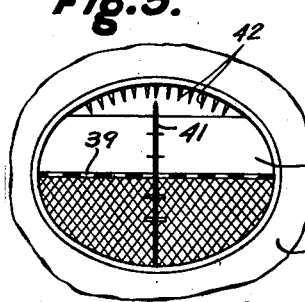
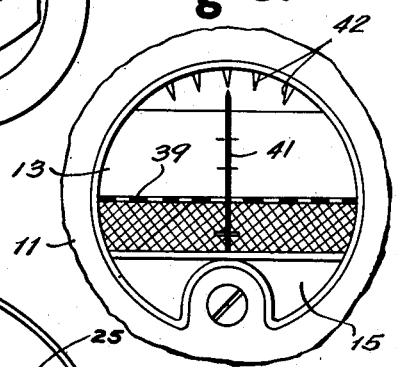
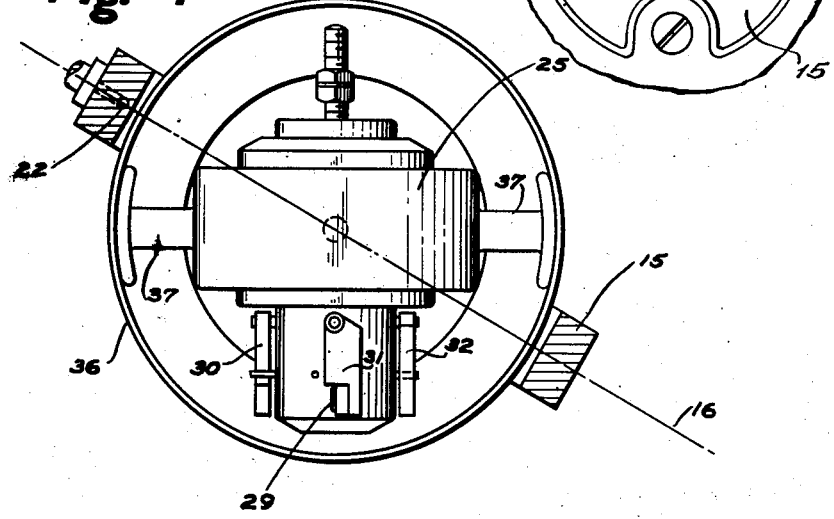
INVENTOR
FREDERICK D. BRADDON
BY
Herbert H. Thompson
his ATTORNEY.

Patented June 27, 1950

2,512,607

UNITED STATES PATENT OFFICE 2,512,607

GYROSCOPIC FLIGHT INDICATOR

Frederick D. Braddon, Babylon, N. Y., assignor to The Sperry Corporation, a corporation of Delaware Application January 31, 1945, Serial No. 575,504

7 Claims. (Cl. 33—204)

This invention pertains to flight indicators of the gyroscopic type. More particularly the invention concerns a roll and pitch position indicating type of gyro vertical instrument generally similar in character to an aircraft gyro horizon.

The primary feature of the invention resides in the provision of an instrument of this character wherein the gimbal ring is so inclined relative to its conventional or normal position that when the craft is in a substantially vertical dive, as in dive bombing, the rotor spin axis and the gimbal axis of the instrument are not substantially in a gimbal lock condition. In the improved arrangement shown, the gimbal ring is pivotally supported at its respective ends in the instrument housing, with the end of the ring adjacent the window of the instrument normally concealed from view, permitting an unobstructed view of the indicator.

Still another feature of the invention resides in the structural provisions utilized in the improved gyro instrument to indicate bank angle or the position of the craft about its roll axis.

Other novel features and details of the invention are hereinafter more particularly set forth in the description of the invention relative to the accompanying drawings in which:

Fig. 1 is a front elevation of the improved gyroscopic instrument;

Fig. 2 is a side elevation of the gyro instrument shown in Fig. 1 with the housing thereof shown in section;

Fig. 3 is a detail plan view of the gimbal ring and rotor case construction of the improved instrument with the ring in an untilted position;

Fig. 4 is a side elevation of the detail parts illustrated in Fig. 3 with the ring in section and with one of the halves of the indicating shell of the instrument removed from position.

Fig. 5 is a front elevation showing a modified type of window in the housing of the instrument; and Fig. 6 is a view similar to Fig. 5 illustrating a further window arrangement.

With reference particularly to Fig. 2 of the drawing, the improved gyro instrument is shown to have an air-tight, air-containing housing formed by a casing 10 and by the front and rear closure plates indicated at 11 and 12 respectively, that are suitably mounted on the casing 10. Plate 11 includes a window 13 therein, through which the indications provided by the instrument are observed. In the described type of gyro instrument, the housing is suitably fixed to the instrument board panel of the craft with the window 13 situated perpendicular or normal to the fore and aft axis of the craft.

As shown in Fig. 2, the housing is divided into two compartments by a wall 14, one compartment having the gyro parts therein, and the other having an air pump therein by which the air within the housing is recirculated for use by the pneumatic gyro. Conventional means that form no part of the present invention enable the pneumatic gyro to be both driven and erected by the air circulated in the instrument by the pump.

The gyro parts of the instrument are situated in the right hand compartment as viewed in Fig. 2 and include a gimbal ring 15 mounted in the housing to pivot about an axis 16. The pivot mounting means for the gimbal ring may be provided by spacing bearings such as indicated at 17 and 18 in Fig. 2 of the drawing. Axis 16 of the ring in the present instance is inclined relative to the fore and aft axis of the dirigible craft on which the instrument is used. The roll or fore and aft axis of the craft relative to the instrument is indicated by horizontal line 19 in the drawing. In conventional instruments of the horizon gyro type, the axis 16 of the gimbal ring of the gyro is coincident with the indicated axis 19. A vertical plane that includes the axis 19 further normally includes the tilted axis 16 of the ring. The gimbal ring in the arrangement shown in Figs. 1 and 2 is mounted to pivot at its respective ends in the housing of the instrument with the end of the gimbal ring adjacent the window normally concealed from view behind wall 11. Bearing post 20 for the hidden end of ring 15 extends inwardly from the front wall 11 of the instrument from a position in the wall below the window 13. When the craft tilts considerably about axis 19, the end of the gimbal adjacent the window comes into view therein. By inclining the axis of the ring in the manner shown and described, the ring axis does not become substantially coincident with the vertical axis of the rotor of the instrument when the craft approaches a vertical dive, thus avoiding a condition of gimbal lock.

The bearing support 17 for the ring 15 of the instrument may be situated in a boss 21 formed in the interior of the casing 10 in the compartment containing the gyro parts. In the pneumatic type of gyro instrument shown, the ring 15 is provided with an air passageway 22, Fig. 3, that opens in the trunnion adjacent the bearing 17 to receive air from the pump by way of ports 23 and connecting channel opening 24. The rotor case 25 of the instrument is of conventional construction the same including therein a suitable gyro rotor (not shown) mounted to spin about a normally vertical axis. The case 25 is mounted to pivot about an axis 26 on the ring 15 with the ring axis 16 and case axis 26 mutually perpendicular. The trunnion supports for the case on the ring are indicated at 27 and 28. Trunnion 28 may be provided with an air passageway 22' (Fig. 3) therein which communicates with the air passageway 22 in the ring. Reference is made to Fig. 1 of U. S. Patent 1,982,636 of December 4, 1934, to show this detail conventional construction. The air passing through the passageway in the trunnion 28 may be utilized as shown in this patent to provide the means for spinning the gyro rotor of the instrument situated within the rotor case 25. The air passing from the case 25 may issue through a number of ports therein, one of which is indicated at 29 in Fig. 4 to pass into the compartment containing the gyro parts of the instrument. Erection of the instrument as shown in the drawing is provided by the conventional pendulous flipper control of the air issuing from the ports in the rotor case 25. Three of such flippers are illustrated in the present instance at 30, 31 and 32 in Fig. 4 of the drawing. Further reference is made to Patent No. 1,982,636 in connection with the details of the erection control which form no part of the present invention. It will be understood that other conventional means for either erecting the instrument or driving the rotor thereof may be employed.

In order to supply air to the erector and spin the rotor in the rotor case 25, a pneumatic pump is situated in the compartment to the left of the wall 14 as viewed in Fig. 2. In its illustrated form the pumping means provided is a centrifugal blower 33 that is mounted on shaft 34 and is driven by a motor unit generally indicated at 35 which forms a part of the rear housing plate 12. The motor unit is composed of a motor and an air-tight casing 35 therefor secured to the rear housing plate 12 so that the air enclosed in housing 10 cannot escape therefrom by way of the motor shaft 34 and its bearings. An intake is provided by opening 36' in wall 14 to the pumping means or blower that connects the respective compartments. Opening 24 in wall 14 is situated at the periphery thereof to provide an outlet for the blower 33 that directly communicates with the air passageway at the adjacent end of the inclined gimbal ring 15. The improved instrument thus includes a self-contained air recirculating system for the gyro parts thereof which has no external piping. In view of the fact there is no loss of air from the housing, changes in external temperature and pressure conditions do not materially affect the operation of the instrument.

The flight indications provided by the improved gyro instrument show the observer the position or attitude of the craft about its fore and aft or roll axis and its athwartship or pitch axis. In this connection a generally spheroidal shell 36 having side openings therein is fixedly mounted on the case 25 by means such as the connecting arms 37 shown in Fig. 4. The upper half of the shell is preferably colored white and the lower half black as indicated so that the intersection defines a line 38 that is representative of an artificial horizon. The index with which line 38 is compared in determining level flight may be a line or bar 39 situated on the window 13 as shown in Fig. 1. Bar 39 may be alternately light and dark colored along its lengthwise dimension as illustrated in the drawing. Shell 36 is preferably constructed of two centrally fitting half sections whose outside surface is also formed to include a plurality of pitch indicating lines such as designated at 40 that are parallel to horizon line 38. Index 39 is read relative to the pitch indicating lines 40 that together form a scale which extends around the periphery of the shell.

In the showing in Fig. 1, the pitch index 39 is in the form of a line that divides the window into unequal parts. In this instance, the top part of the window is larger than the bottom part. The rotor case 25 and shell 36 are universally mounted within the housing with complete freedom of movement about the mutually perpendicular axes 26 and 16.

Fig. 5 shows a modified form of instrument in which the window 13 in the housing 11 is elliptical in form. In this instance, the pitch index 39 is a horizontal line situated along the major axis of the elliptical window.

In the form of the invention, shown in Fig. 6, the window 13 is generally circular and the pitch index 39 is in the form of a line that extends through the center of the window. The end of the gimbal 15 adjacent the window in this instance is observable in the window at all times.

In Fig. 2, the normally observed roll index or pointer 41, is fixedly mounted on one of the ends of the gimbal ring 15. The pointer 41, as shown, extends in perpendicular relation to the axis of the ring to a position in which the same is normally observed in the window 13. Thus the improved instrument is particularly sensitive in indicating displacement of the craft about its roll axis due to the above average length of the index 41. A reference scale 42 is situated on the upper part of the window as viewed in Fig. 1 and the roll pointer is read in connection therewith. In the showing of the parts in the drawing the craft is not banked as the pointer 41 is adjacent the zero mark of the reference scale 42. A second roll pointer 43 is also provided on the ring 15. This pointer is displaced from the pointer 41 by an angle of 180 degrees and is normally hidden from view in the window. The additional pointer 43 comes into view in the window as the craft moves about its roll or fore and aft axis and is in an upside down condition. The two pointers together provide an unambiguous roll indication as the craft moves about its fore and aft axis.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro vertical for dirigible craft, a housing and a rotor case supporting gimbal ring pivotally mounted in said housing to move about an axis that is inclined relative to the fore and aft axis of the craft and situated in a vertical plane including the fore and aft axis of the craft to prevent occurrence of gimbal lock when the craft is in a substantially vertical dive.

2. In a gyroscopic flight indicator for dirigible craft, an instrument housing fixed to the craft having a window therein normal to the fore and aft axis of the craft, a rotor case supporting gimbal ring mounted in said housing at its respective ends to pivot about an axis that is inclined relative to the fore and aft axis of the craft and is normally situated in a vertical plane that includes the fore and aft axis of the craft.

3. In a gyroscopic flight indicator for dirigible craft, an instrument housing fixed to the craft having a window therein normal to the fore and aft axis of the craft, a rotor case supporting gimbal ring, pivot means at the respective ends of said ring for mounting the same in said housing to move about an axis that is inclined relative to the fore and aft axis of the craft and is normally situated in a vertical plane that includes the fore and aft axis of the craft, the arrangement being such as to normally conceal the end of the gimbal ring adjacent the window from view.

4. In a gyroscopic roll and pitch indicating instrument for dirigible craft, a housing fixed to the craft having a window therein normal to the fore and aft axis of the craft, a rotor case supporting gimbal ring mounted in said housing at its respective ends to pivot about an axis that is inclined relative to the fore and aft axis of the craft and is normally situated in a vertical plane that includes the fore and aft axis of the craft, the end of the gimbal ring adjacent the window turning in a bearing situated below the window, and a roll indicating pointer fixedly mounted on the end of the ring adjacent the window extending in perpendicular relation to the axis of said ring to a position in which the same is normally observed in said window.

5. An instrument as claimed in claim 4 that includes a normally hidden second roll pointer mounted on the window adjacent end of the ring and displaced from the front pointer by an angle of 180 degrees.

6. In a gyroscopic roll and pitch indicating instrument for dirigible craft, a housing fixed to the craft having a window therein normal to the fore and aft axis of the craft, a rotor case, a rotor case supporting gimbal ring mounted in said housing to pivot about an axis that is inclined relative to the fore and aft axis of the craft and is normally situated in a vertical plane that includes the fore and aft axis of the craft, a horizontal indicator on said rotor case, and a pitch index in the form of a horizontal line on said window which divides the same into unequal parts, the top part being larger than the bottom part.

7. In a gyroscopic roll and pitch indicating instrument for dirigible craft, a housing fixed to the craft having an elliptical window therein normal to the fore and aft axis of the craft, a rotor case, a rotor case supporting gimbal ring mounted in said housing to pivot about an axis that is inclined relative to the fore and aft axis of the craft and is normally situated in a vertical plane that includes the fore and aft axis of the craft, a horizontal indicator on said rotor case, and a pitch index in the form of a horizontal line on the major axis of the elliptical window.

FREDERICK D. BRADDON.

REFERENCES CITED

The following references are of record in the file of this patent:

UNITED STATES PATENTS

| Number | Name | Date |
|---|---|---|
| 1,886,714 | Moss | Nov. 8, 1932 |
| 1,939,825 | Narvesen et al. | Dec. 19, 1933 |
| 1,982,636 | Carlson | Dec. 4, 1934 |
| 2,053,183 | Crane et al. | Sept. 1, 1936 |
| 2,242,806 | Wünsch | May 20, 1941 |
| 2,308,234 | Brennan | Jan. 12, 1943 |
| 2,367,667 | Carter | Jan. 23, 1945 |

FOREIGN PATENTS

| Number | Country | Date |
|---|---|---|
| 13,280 | Great Britain | 1915 |